(12) United States Patent
Lu et al.

(10) Patent No.: US 9,478,798 B2
(45) Date of Patent: Oct. 25, 2016

(54) PRUSSIAN BLUE ANALOGUE ELECTRODES WITHOUT ZEOLITIC WATER CONTENT

(71) Applicant: Sharp Laboratories of America, Inc., Camas, WA (US)

(72) Inventors: Yuhao Lu, Camas, WA (US); Jie Song, Vancouver, WA (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 14/830,838

(22) Filed: Aug. 20, 2015

(65) Prior Publication Data

US 2015/0357630 A1 Dec. 10, 2015

Related U.S. Application Data

(63) Continuation-in-part of application No. 14/827,001, filed on Aug. 14, 2015, which is a continuation-in-part of application No. 14/823,399, filed on Aug. 11, 2015, which is a continuation-in-part (Continued)

(51) Int. Cl.
  *H01M 4/00* (2006.01)
  *H01M 4/136* (2010.01)
  (Continued)

(52) U.S. Cl.
  CPC ............... *H01M 4/136* (2013.01); *C01C 3/11* (2013.01); *H01M 4/58* (2013.01); *Y02E 60/122* (2013.01)

(58) Field of Classification Search
  CPC .... H01M 4/136; H01M 4/58; H01M 10/054; H01M 4/133; H01M 4/1345; H01M 4/04; H01M 4/381; Y02E 60/122; Y02E 60/50; C01B 31/00; C01B 31/04; C01B 31/30; C01D 1/02

USPC .................................. 429/211; 252/519.14
See application file for complete search history.

(56) References Cited

U.S. PATENT DOCUMENTS

2012/0328936 A1* 12/2012 Wessells ............. H01M 10/054
  429/188
2013/0052538 A1* 2/2013 Pasta .................... H01M 4/362
  429/245

(Continued)

OTHER PUBLICATIONS

V.D. Neff, Some performance characteristics of a Prussian Blue battery, Journal of Electrochemical Society, 132 (1985) 1382-1384.

(Continued)

*Primary Examiner* — Cynthia H Kelly
*Assistant Examiner* — Monique Wills
(74) *Attorney, Agent, or Firm* — Law Office of Gerald Maliszewski; Gerald Maliszewski

(57) ABSTRACT

A battery is provided with a hexacyanometallate cathode. The battery cathode is made from hexacyanometallate particles overlying a current collector. The hexacyanometallate particles have the chemical formula $A_X M1_M M2_N (CN)_Z \cdot d[H_2O]_{ZEO} \cdot e[H_2O]_{BND}$, where A is a metal from Groups 1A, 2A, or 3A of the Periodic Table, where M1 and M2 are each a metal with 2+ or 3+ valance positions, where "ZEO" and "BND" indicate zeolitic and bound water, respectively, where d is 0, and e is greater than 0 and less than 8. The anode material may primarily be a material such as hard carbon, soft carbon, oxides, sulfides, nitrides, silicon, metals, or combinations thereof. The electrolyte is non-aqueous. A method is also provided for fabricating hexacyanometallate with no zeolitic water content in response to dehydration annealing at a temperature of greater than 120 degrees C. and less than 200 degrees C.

18 Claims, 10 Drawing Sheets

Related U.S. Application Data of application No. 14/795,834, filed on Jul. 9, 2015, which is a continuation-in-part of application No. 14/668,788, filed on Mar. 25, 2015, which is a continuation-in-part of application No. 14/472,228, filed on Aug. 28, 2014, which is a continuation-in-part of application No. 14/340,141, filed on Jul. 24, 2014, which is a continuation-in-part of application No. 14/320,352, filed on Jun. 30, 2014, which is a continuation-in-part of application No. 14/271,498, filed on May 7, 2014, which is a continuation-in-part of application No. 14/230,882, filed on Mar. 31, 2014, which is a continuation-in-part of application No. 14/198,755, filed on Mar. 6, 2014, which is a continuation-in-part of application No. 14/198,702, filed on Mar. 6, 2014, which is a continuation-in-part of application No. 14/198,663, filed on Mar. 6, 2014, which is a continuation-in-part of application No. 14/193,782, filed on Feb. 28, 2014, which is a continuation-in-part of application No. 14/193,501, filed on Feb. 28, 2014, which is a continuation-in-part of application No. 14/174,171, filed on Feb. 6, 2014, which is a continuation-in-part of application No. 14/067,038, filed on Oct. 30, 2013, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.
*H01M 4/58* (2010.01)
*C01C 3/11* (2006.01)

(56) References Cited

U.S. PATENT DOCUMENTS

2014/0220392 A1   8/2014   Wessells et al.
2014/0308544 A1   10/2014  Wessells et al.

OTHER PUBLICATIONS

N. Imanishi et al., Lithium intercalation behavior into iron cyanide complex as positive electrode of lithium secondary battery, Journal of Power Sources, 79 (1999) 215-219.
Y. Lu, L. Wang, J. Cheng, J.B. Goodenough, Prussian blue: a new framework for sodium batteries, Chemistry Communication, 48(2012)6544-6546.
L. Wang, Y. Lu, J. Liu, M. Xu, J. Cheng, D. Zhang, J.B. Goodenough, A superior low-cost cathode for a Na-ion battery, Angew. Chem. Int. Ed., 52(2013)1964-1967.
A. Eftekhari, Potassium secondary cell based on Prussian blue cathode, J.Power Sources, 126 (2004) 221-228.
C.D. Wessells, R.A. Huggins, Y. Cui, Copper hexacyanoferrate battery electrodes with long cycle life and high power, Nature Communication, 2( 2011) 550.
C.D. Wessells et al,, Nickel hexacyanoferrate nanoparticle electrodes for aqueous sodium and potassium ion batteries, Nano Letter, 11(2011) 5421-5425.
C.D. Wessells et al., The effect of insertion species on nanostructured open framework hexacyanoferrate battery electrode, J. Electrochem. Soc., 159(2012) A98-A103.
J. Song et al., "Removal of Interstitial H2O in Hexacyanometallates for a Superior Cathode of a Sodium-Ion Battery", J. Am. Chem. Soc., 137(2015)2658-2664.
L. Wang et al., "Rhombohedral Prussian White as Cathode for Rechargeable Sodium-Ion Batteries", J. Am. Chem. Soc., 137(2015)2548-2554.
X. Wu et al., Single-crystal FeFe(CN)6 nanoparticles: a high capacity and high rate cathode for Na-ion batteries, J. Mater. Chem. A., 1(2013) 10130-10134.
M.B. Robin, The color and electronic configurations of Prussian blue, Inorganic Chemistry, 1(1962)337-342.
You, Y et al., High-quality Prussian blue crystals as superior cathode materials for room-temperature sodium-ion batteries. Energy & Environmental Science 7, 1643-1647.

* cited by examiner

PRUSSIAN BLUE ANALOGUE ELECTRODES WITHOUT ZEOLITIC WATER CONTENT

This invention was made with Government support under DE-AR0000297 awarded by DOE. The Government has certain rights in this invention.

RELATED APPLICATIONS

All applications listed in the Application Data Sheet associated with the instant application are incorporated herein by reference.

BACKGROUND OF THE INVENTION

1. Field of the Invention

This invention generally relates to electrochemical batteries and, more particularly, to a battery cathode comprised of a Prussian blue analogue with no zeolitic water content.

2. Description of the Related Art

Prussian blue analogues (PBA), often referred to as transition metal hexacyanometallates (TMHMs), have been investigated as cathode materials for rechargeable lithium-ion batteries [1, 2], sodium-ion batteries [3, 4], and potassium-ion batteries [5]. With an aqueous electrolyte containing the proper amount of alkali-ions or ammonium-ions, copper and nickel hexacyanoferrates ((Cu,Ni)-HCFs) exhibited a very good cycling life where 83% capacity was retained after 40,000 cycles at a charge/discharge current of 17 C [6-8]. However, electrochemical devices using PBAs as a cathode material with an aqueous electrolyte can only operate at low voltages (less than 2 volts (V)) because the water in the electrolyte can be decomposed by the process of electrolysis, which occurs at voltages greater than 1.23 V. On the other hand, electrochemical devices with PBA cathodes and non-aqueous electrolytes have a higher voltage output and, therefore, a higher energy density. Manganese hexacyanoferrate (Mn-HCF) and iron hexacyanoferrate (Fe-HCF) were used as cathode materials in non-aqueous electrolyte [9, 10]. Assembled with a sodium-metal anode in a half cell configuration or with hard carbon anode in a full cell configuration, Mn-HCF and Fe-HCF electrodes have the capacity to cycle between 2.0V and 4.5 V and to deliver reversible capacities of greater than 140 milliamp hours per gram (mAh/g).

FIG. 1 is a diagram depicting the open framework structure associated with the general formula of $A_XM1_MM2_N(CN)_Z$ (prior art). The open framework structure of the TMHMs facilitates both rapid and reversible intercalation processes for alkali (Group 1A), alkaline (Group 2A), and Group 3A ions ($A_X$). The capacity of the TMHM is determined by the available A-sites in the compounds into which the alkali, alkaline, and Group 3A ions can be intercalated reversibly in the range of working voltages.

FIG. 12 is a schematic diagram depicting the redox potential of various transition metals vs. Na°. The drawings depicts why a non-aqueous electrolyte must be selected if a battery operating voltage is to exceed the 1.23 volt water electrochemical window (E.W.). Since Mn and Fe have a redox potential between 2-4 V vs. Na°, sodium-ions can be intercalated/deintercalated into/from $Na_2MnFe(CN)_6$ between 2-4 V vs. Na°, and its theoretical capacity is 171 mAh/g. Similarly, 2 sodium-ions can be intercalated/deintercalated into/from $Na_2FeFe(CN)_6$ between 2-4 V vs. Na° and its theoretical capacity is also around 170 mAh/g. However, for $Na_2FeCu(CN)_6$, only one sodium-ion per formula can be reversibly inserted/removed into/from the compound because the redox potential of $Cu^{3+/2+}$ is higher than 4 V vs. Na°. Its theoretical capacity is 83 mAh/g, which is about half the value of $Na_2FeFe(CN)_6$ or $Na_2MnFe(CN)_6$. Accordingly, an electrolyte with a wider electrochemical window must be used if $Cu^{3+/2+}$ is the active material in a sodium-ion battery. It is worth noting that a proper anode, with a low working potential to match the water reactive area, is also required for a battery in order to achieve a high operation voltage (i.e. greater than 1.23 volts).

Due to the large interstitial spaces, it is also inevitable that water molecules readily occupy the A-sites in PBAs during the material synthesis process. The behavior of water absorption in PBAs resembles a process where water is absorbed by zeolitic materials. As a result, at least one researcher has referred to these water molecules as zeolitic water [14]. Accordingly, the PBA formula is often written as $A_XM1_MM2_N(CN)_Z \cdot dH_2O$, where $dH_2O$ is zeolitic water. This same reference (Wessells) states that, at least in theory, the value of d may be zero. However, this analysis is inaccurate. First, this same references states that their electrochemical device is not stable if all the water is removed from the PBA lattice. Second, different amounts of water in PBA result in different battery configurations. Third, a synthesized PBA material includes two types of water. One type of water is the above-mentioned zeolitic water, which might also be referred to as interstitial water. The second type of water is bound water, which might also be referred to as lattice or lattice-bound water. Managing these two types of water in a PBA lattice is a key to making different batteries using PBA materials.

As noted in the Encyclopedia Britannica's discussion of clay-water relations (http://www.britannica.com/science/clay-mineral/Clay-water-relations#ref618526), "(t)he water adsorbed between layers or in structural channels may further be divided into zeolitic and bound waters. The latter is bound to exchangeable cations or directly to the clay mineral surfaces. Both forms of water may be removed by heating to temperatures on the order of 100°-200 degree C. and in most cases, are regained readily at ordinary temperatures. It is generally agreed that the bound water has a structure other than that of liquid water; its structure is most likely that of ice." Alternatively stated, is that zeolitic water is physically trapped in the crystal structure, whereas the bound water is chemically bonded with the crystal. Because of the chemical bond, a higher temperature is needed to remove the bound water from a crystal.

While it is possible to remove zeolitic water from a PBA compound, it can only be done using a high temperature process, as disclosed herein. As explained in detail below, it is not possible to completely remove zeolitic water using the 70 to 100 degree C. temperatures disclosed in the Wessells application [14], and the resultant PBA material therefore includes at least 20% zeolitic water by weight. The zeolitic water occupies the void (~0.35 nanometer (nm) in diameter) at the center of the PBA lattice. Wessells suggested that because the hydrated A-cations ($Na^+$, $K^+$, $Mg^{2+}$, $Ca^{2+}$, $Ba^{2+}$) have a Stokes ionic diameter of about 0.35 nm, the hydrated sodium and potassium in electrolyte might be exchanged with zeolitic water already present in the crystal structure that contribute to the mechanism for ion transport through the lattice. The PBA materials disclosed herein, however, permit the fabrication of electrochemical devices with much higher energy density than Wessells' device. In order to do so, the PBA electrode needs to have higher capacity (mAh/g), and it must be to operate at higher voltages. If the zeolitic water is not completely removed from the PBA material it is not feasible to make an electrochemical device with a higher capacity and voltage using such a PBA as a cathode. One requirement for higher voltage electrochemical devices is the use of a non-aqueous electrolyte, since electrolysis (water decomposition) occurs at voltages higher than 1.23 volts. Most importantly, the zeolitic water should be avoided in the PBAs because it can move to the non-aqueous electrolyte freely to reduce its electrochemical window.

The other type of water found in as-synthesized PBA compounds is bound water. As explained in detail below, bound water can be reduced using temperatures greater than those required to remove the zeolitic water. However, it is unlikely that this type of water can be completely removed without degrading the PBA compound. Unlike zeolitic water, which can freely escape into a non-aqueous electrolyte, the chemical interaction between bound water and PBA restricts the presence of water in a non-aqueous electrolyte.

It would be advantageous if a PBA compound could be made using a process that completely removed zeolitic water and at least minimized the bound water content.

It would be advantageous if a battery or capacitor could be fabricated with a PBA cathode capable of efficiently working in voltage ranges greater than 2 V.

[1] V. D. Neff, Some performance characteristics of a Prussian Blue battery, Journal of Electrochemical Society, 132 (1985) 1382-1384.

[2] N. Imanishi, T. Morikawa, J. Kondo, Y. Takeda, O. Yamamoto, N. Kinugasa, T. Yamagishi, Lithium intercalation behavior into iron cyanide complex as positive electrode of lithium secondary battery, Journal of Power Sources, 79 (1999) 215-219.

[3] Y. Lu, L. Wang, J. Cheng, J. B. Goodenough, Prussian blue: a new framework for sodium batteries, Chemistry Communication, 48(2012)6544-6546.

[4] L. Wang, Y. Lu, J. Liu, M. Xu, J. Cheng, D. Zhang, J. B. Goodenough, A superior low-cost cathode for a Na-ion battery, Angew. Chem. Int. Ed., 52(2013)1964-1967.

[5] A. Eftekhari, Potassium secondary cell based on Prussian blue cathode, J. Power Sources, 126 (2004) 221-228.

[6] C. D. Wessells, R. A. Huggins, Y. Cui, Copper hexacyanoferrate battery electrodes with long cycle life and high power, Nature Communication, 2(2011) 550.

[7] C. D. Wessells, S. V. Peddada, R. A. Huggins, Y. Cui, Nickel hexacyanoferrate nanoparticle electrodes for aqueous sodium and potassium ion batteries, Nano Letter, 11(2011) 5421-5425.

[8] C. D. Wessells, S. V. Peddada, M. T. McDowell, R. A. Huggins, Y. Cui, The effect of insertion species on nanostructured open framework hexacyanoferrate battery electrode, J. Electrochem. Soc., 159(2012) A98-A103.

[9] J. Song, L. Wang, Y. Lu, J. Liu, B. Guo, P. Xiao, J.-J. Lee, X.-Q. Yang, G. Henkelman, J. B. Goodenough, "Removal of Interstitial $H_2O$ in Hexacyanometallates for a Superior Cathode of a Sodium-Ion Battery", J. Am. Chem. Soc., 137(2015)2658-2664.

[10] L. Wang, J. Song, R. Qiao, L. A. Wray, M. A. Hossain, Y.-D. Chuang, W. Yang, Y. Lu, D. Evans, J.-J. Lee, S. Vail, X. Zhao, M. Nishijima, S. Kakimoto, J. B. Goodenough, "Rhombohedral Prussian White as Cathode for Rechargeable Sodium-Ion Batteries", J. Am. Chem. Soc., 137 (2015)2548-2554.

[11] X. Wu, W. Den, J. Qian, Y. Cao, X. Ai, H. Yang, Single-crystal $FeFe(CN)_6$ nanoparticles: a high capacity and high rate cathode for Na-ion batteries, J. Mater. Chem. A., 1(2013)10130-10134.

[12] M. B. Robin, The color and electronic configurations of Prussian blue, Inorganic Chemistry, 1(1962)337-342.

[13] You, Y., Wu, X.-L., Yin, Y.-X. & Guo, Y.-G. High-quality Prussian blue crystals as superior cathode materials for room-temperature sodium-ion batteries. Energy & Environmental Science 7, 1643-1647.

[14] Colin Wessells et al., High Rate, Long Cycle Life Battery Electrode Materials with an Open Framework Structure, US 2012/0328936, published Dec. 27, 2012.

[15] Colin Wessells et al., Prussian Blue Analogue Anodes for Aqueous Electrolyte Batteries, US 2014/0220392, published Aug. 7, 2014.

[16] Colin Wessells et al., Cosolvent Electrolytes for Electrochemical Devices, US 2014/0308544, published Oct. 16, 2014.

SUMMARY OF THE INVENTION

Disclosed herein is a Prussian blue analogue (PBA) material formulated without a zeolitic water content. As noted above, despite the theoretic potential of zero zeolitic water content, all conventional PBA materials include components of both zeolitic and bound water. The bound water in these PBAs is even more difficult to remove than the zeolitic water. The PBA presented herein can be represented as $A_X M1_M M2_N(CN)_Z \cdot d[H_2O]_{ZEO} \cdot e[H_2O]_{BND}$ in which "ZEO" and "BND" indicate water in zeolitic and bound water, respectively. In consideration of the fact that zeolitic water may gradually escape from a PBA material once the PBA is immersed into a non-aqueous electrolyte and undergoes charge/discharge cycling, it is imperative that the zeolitic water be removed prior to use, to prevent water from contaminating non-aqueous electrolytes.

Accordingly, a battery is provided with a hexacyanometallate cathode. The battery cathode is made from hexacyanometallate particles overlying a current collector. As noted above, the hexacyanometallate particles have the chemical formula $A_X M1_M M2_N(CN)_Z \cdot d[H_2O]_{ZEO} \cdot e[H_2O]_{BND}$.

A is a metal from Groups 1A, 2A, or 3A of the Periodic Table, such as $Na^+$, $K^+$, $Mg^{2+}$, $Al^{+3}$, $Zn^{+3}$, or $Ca^{2+}$. M1 and M2 are each a metal with 2+ or 3+ valance positions, such as Ti, V, Cr, Mn, Fe, Co, Ni, Cu, Zn, Ca, and Mg. The variables are as follows:

x is in the range of 0.5 to 2;
M is in the range of 0.5 to 1.5;
N is in the range of 0.5 to 1.5;
Z is in the range of 5 to 6;
d is 0; and,
e is in the range of greater than 0 and less than 8.

The battery is also composed of a non-aqueous electrolyte and an anode. The anode material may primarily be a material such as hard carbon, soft carbon, oxides, sulfides, nitrides, silicon, metals, or combinations thereof. The non-aqueous electrolyte may be an organic solvent, gel, polymer, or solid electrolyte. While non-aqueous electrolytes advantageously permit the use of higher voltages, aqueous electrolytes may also be used.

A method is also provided for fabricating hexacyanometallate with no zeolitic water content. The method begins with hexacyanometallate particles having the chemical formula $A_X M1_M M2_N(CN)_Z \cdot d1[H_2O]_{ZEO} \cdot e1[H_2O]_{BND}$.

where d1 is in a range of 1 to 14; and,
where e1 is greater than 0.

The method exposes the hexacyanometallate particles to dehydration annealing at a temperature of greater than 120 degrees C. and less than 200 degrees C. In response to the dehydration annealing, $A_X M1_M M2_N(CN)_Z \cdot d[H_2O]_{ZEO} \cdot e[H_2O]_{BND}$ is formed, where d=0 and e1≥e. Typically, e>0.

In one aspect, the hexacyanometallate particles are mixed with a conducting carbon and binder in a solvent, to form a slurry. The slurry is coated on a current collector and dried to remove the solvent. As a result, a cathode is formed. In this aspect, dehydration annealing may be performed on the hexacyanometallate particles prior to forming the slurry, subsequent to removing the solvent from the hexacyanometallate cathode, or both prior to forming the slurry and subsequent to removing the solvent from the hexacyanometallate cathode.

Additional details of the above-described hexacyanometallate material, a battery, and a fabrication method are provided below.

DETAILED DESCRIPTION

Figure 1:
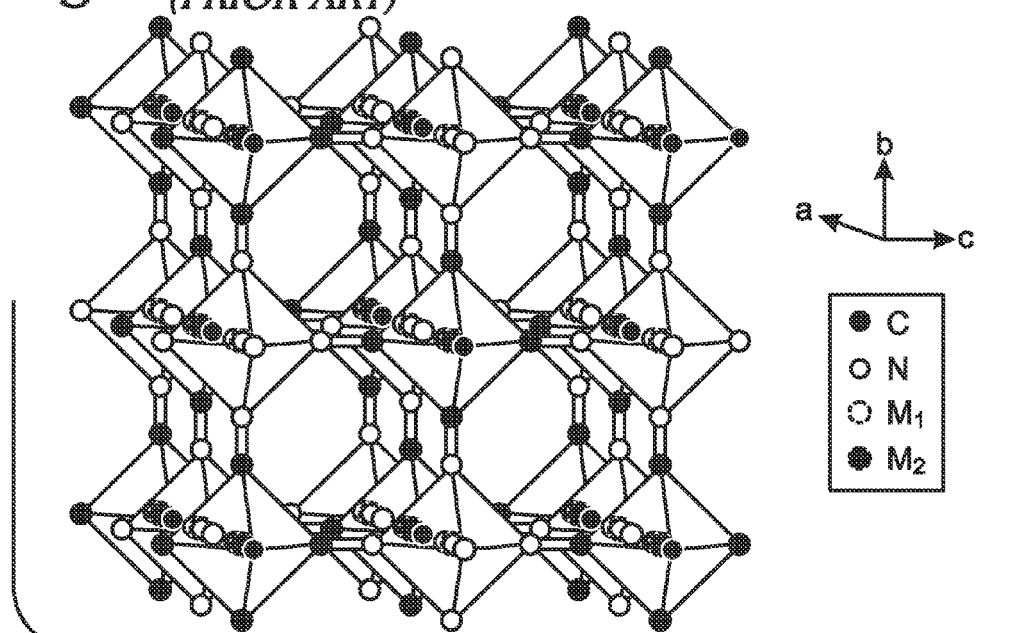
FIG. 1 is a diagram depicting the open framework structure associated with the general formula of $A_XM1_MM2_N(CN)_Z$ (prior art).
Figure 2:
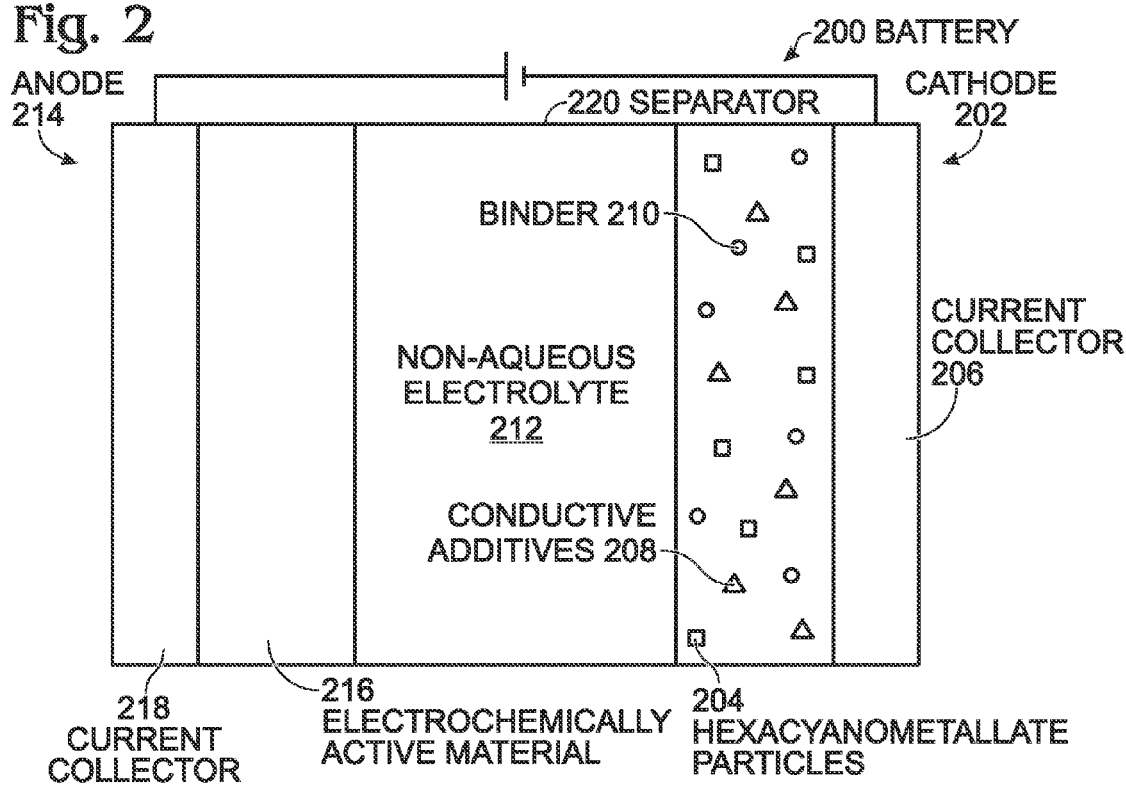
FIG. 2 is a partial cross-sectional view of a battery with a hexacyanometallate cathode.

FIG. 2 is a partial cross-sectional view of a battery with a hexacyanometallate cathode. The battery 200 comprises a cathode 202 with hexacyanometallate particles 204 as the primary component overlying a current collector 206. The hexacyanometallate particles 204 have the chemical formula $A_XM1_MM2_N(CN)_Z \cdot d[H_2O]_{ZEO} \cdot e[H_2O]_{BND}$.

"A" is a metal from Groups 1A, 2A, or 3A of the Periodic Table, such as $Na^+$, $K^+$, $Mg^{2+}$, $Al^{+3}$, $Zn^{+3}$, or $Ca^{2+}$. M1 is a metal having a 2+ or 3+ valance position, such as Ti, V, Cr, Mn, Fe, Co, Ni, Cu, Zn, Ca, or Mg. Likewise, M2 is a metal with a 2+ or 3+ valance position, such as Ti, V, Cr, Mn, Fe, Co, Ni, Cu, Zn, Ca, or Mg. The M1 and M2 may be the same or a different metal. $[H_2O]_{ZEO}$ represents zeolitic water molecules. $[H_2O]_{BND}$ represents bound water molecules. The variables are as follows:

x is in the range of 0.5 to 2;
M is in the range of 0.5 to 1.5;
N is in the range of 0.5 to 1.5;
Z is in the range of 5 to 6;
d is 0; and,
e is in the range of greater than 0 and less than 8.

As is conventional, the cathode 202 may also include conductive additives 208, such as carbon black, carbon nanotubes (CNTs), or carbon nanofibers (CNFs). The cathode 202 may also include a binder 210 such as poly (vinylidene fluoride) (PVDF), copolymers of PVDF e.g. poly(vinylidene fluoride-co-hexa fluoropropylene) (PVDF-HFP), PVC, PVA, polyethylene (PE), polypropylene (PP), ethylene vinyl acetate, and celluloses, e.g. methyl cellulose, carboxymethyl cellulose, ethyl cellulose, butyl cellulose, cellulose acetate, and cellulose nitrate. The conductive additives and binders comprise less than 50% of the cathode. Note: the drawing is intended as a general schematic and should not be interpreted as a physical structure or mixture. Typically, the elements of the cathode described above are not physically separated, but are bound together by the binder material.

The battery 200 also includes a non-aqueous electrolyte 212 and an anode 214. The non-aqueous electrolyte 212 may be an organic solvent, gel, polymer, or solid electrolyte. The electrolyte may be aqueous, but a non-aqueous electrolyte is preferred as it results in better battery performance. If the non-aqueous electrolyte 212 is not a liquid, then an ion-permeable barrier or separator 220 may not be required. Some examples of non-aqueous electrolytes include one or a few types of carbonates, e.g., ethylene carbonate (EC), propylene carbonate (PC), dimethyl carbonate (DMC) and diethyl carbonate (DEC) etc. Alternatively, the electrolyte can be a gel or solid film, which also acts as a separator (ion-permeable barrier). The electrolyte may comprise a polymer host, e.g., PVDF, PVDF-HFP, PEO, PAN, and PMMA or an ionic liquid e.g. $PYR_{14}FSI$, [BMIM]Cl and [EMIM]Cl, and may further include an optional plasticizer e.g. inorganic nanoparticles ($SiO_2$, $Al_2O_3$ and MgO etc.), and EC and PC to strengthen the ionic conductivity. The electrolyte also includes a salt to provide A-ions for ionic conducting, to support the shuffling of A-ions between cathode and anode during charge/discharge cycling. For example, if "A" is sodium, the salt may be $NaPF_6$ or $NaClO_4$.

The anode 214 may primarily be an electrochemically active material 216 such as a hard carbon, soft carbon, oxides, sulfides, nitrides, silicon, metals (such as Sb, Pb, or Sn), or combinations thereof over a current collector 218. As used herein, "primarily" or "primary component" means more than 50% by weight. In some aspects, the anode 214 may further comprise conductive additives and a binder, examples of which have been provided above.

Again, it should be understood that the drawing is partially schematic in nature. The cathode 202 is typically is close physical proximity to anode 214, with an intervening separator 220 that acts as an electrical insulator. The cathode 202, anode 214, and separator 220 are porous, with the electrolyte 212 (e.g., a liquid electrolyte), filling those pores.

Unlike the hexacyanometallate or Prussian blue analogues reported in the prior art [1-7 and 10-16], the zeolitic water has been eliminated in the PBA disclosed herein. As such, these PBAs can be used in non-aqueous electrolyte batteries to achieve a stable performance. The zeolitic water existing in conventional PBAs, in contrast, is known to degrade the metal-ion batteries dramatically, as proved below.

Example 1

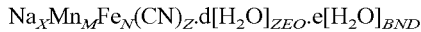

$Na_X Mn_M Fe_N(CN)_Z \cdot d[H_2O]_{ZEO} \cdot e[H_2O]_{BND}$

Figure 3:
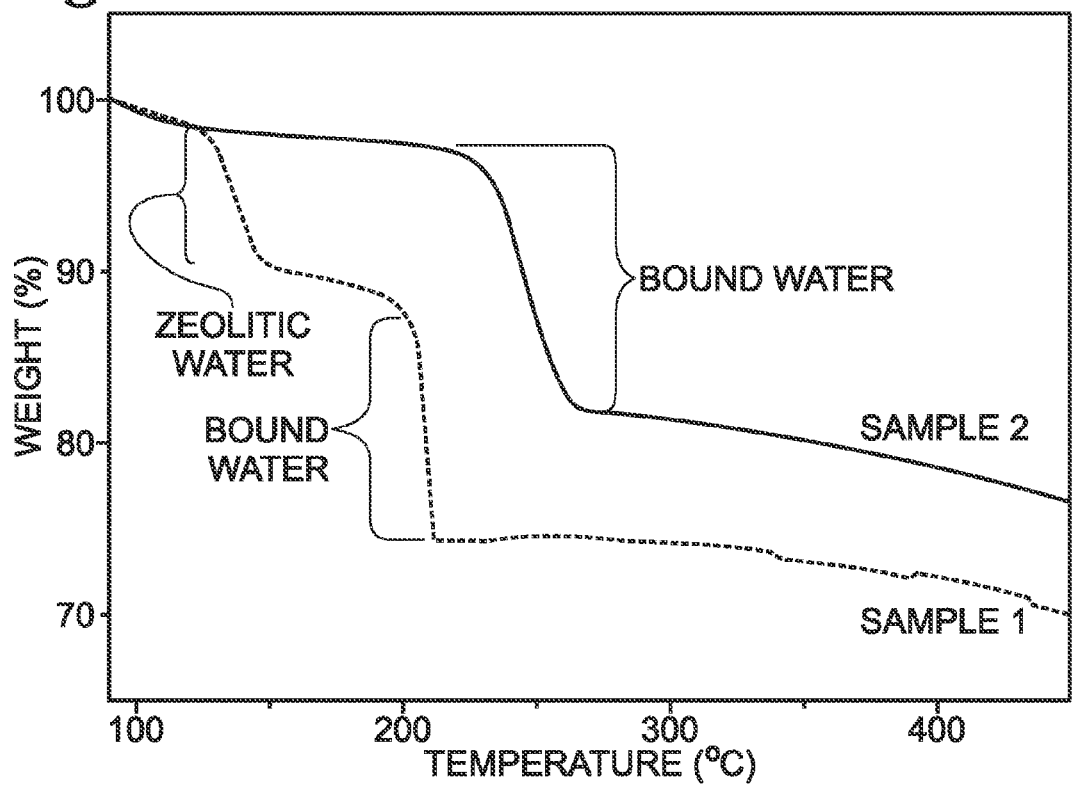
FIG. 3 is a thermogravimetric (TGA) graph comparing the water content of a conventional PBA against the PBA disclosed herein.

FIG. 3 is a thermogravimetric (TGA) graph comparing the water content of a conventional PBA against the PBA disclosed herein. After PBA synthesis using a precipitation process, the PBA particles were filtered and dried. The drying temperature of the conventional PBA is typically lower than 100 degree C., with a vacuum atmosphere, in $N_2$, or in ambient air. Wessells, for example, dried their PBA at room temperature under vacuum prior to coating a current collector [14]. Sample 1 is a conventional PBA with the specific name of sodium manganese hexacyanoferrate, which was dried at 100 degrees C. after synthesis. Conventional PBAs, such as the ones described by Wessells [14] all belong to this group since the drying temperature is below 100 degrees C. Sample 1 was subjected to thermogravimetric analysis (TGA) to measure the sample weigh loss while increasing the temperature. Two weight loss regions were observed: at the temperature between 130 and 150 degrees C., and at the temperature between 200 and 210 degrees C. It was confirmed the analysis of mass spectroscopy that it is water escaping from the Sample 1 that contributed the weight losses in these two regions. Due to the weak interaction between zeolitic water molecules and PBA framework, water molecules can be easily removed at temperatures between 130 and 150 degrees C. In contrast, bound water has a chemical bond to the PBA lattice, and a higher temperature is needed to remove the bound water from the PBA lattice. In Sample 1, a temperature between 200 and 210 degrees C. is needed to remove the bound water from PBA lattice. Therefore, Sample 1 has the chemical formula of $Na_X Mn_M Fe_N(CN)_Z \cdot d1[H_2O]_{ZEO} \cdot e1[H_2O]_{BND}$, where both d1 and e1 are greater than zero. Although Wessells states that the value of d1 may theoretically be zero [14], he provides no examples of such, and the existence of zeolitic water in his PBA compounds is a fact well known to those with skill in the art. Further, Wessells was either unaware or simply failed to acknowledge the existence of bound water in his PBA.

In contrast, the PBA material disclosed herein (Sample 2) was subjected to a dehydration annealing at 150 degrees C. In light of the analysis of Sample 1, the dehydration annealing removed the zeolitic water from Sample 2 so that weight loss only occurred at temperatures above 200 degrees C. Bound water molecules have a strong chemical interaction with the PBA lattice, so a high energy (temperature) is required to break the interaction and release this water from the lattice. Furthermore, because of the strong interaction, bound water is not released into the electrolyte of a sodium-ion battery during normal usage. Since this bound water is not released into the electrolyte, a non-aqueous electrolyte may be used, which is turn permits the use of battery voltages greater than 1.23 volts. The comparison of Sample 1 to Sample 2 stands as evidence that the $Na_X Mn_M Fe_N(CN)_Z \cdot d[H_2O]_{ZEO} \cdot e[H_2O]_{BND}$ (d=0) disclosed herein is different from the conventional material

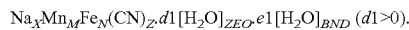

$Na_X Mn_M Fe_N(CN)_Z \cdot d1[H_2O]_{ZEO} \cdot e1[H_2O]_{BND}$ (d1>0).

Figure 4:
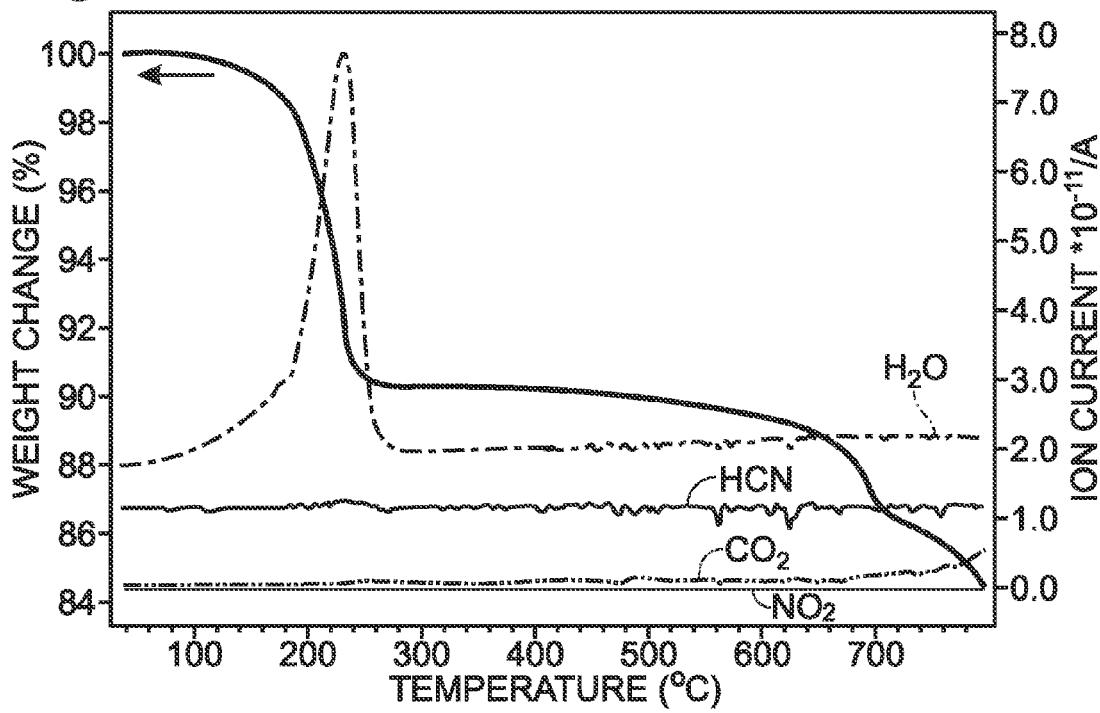
FIG. 4 is a graph combining the analysis of Sample 2 using TGA and mass spectroscopy (MS).

FIG. 4 is a graph combining the analysis of Sample 2 using TGA and mass spectroscopy (MS). The MS was used to analyze the chemical release from Sample 2. At temperatures between 200 and 250 degrees C., TGA indicated sample weight loss and the MS detected $H_2O$ release from the PBA lattice. As seen in the figure, only bound water was contained in the Sample 2 PBA material, which was released at temperatures between 200 and 250 degrees C.

Figure 5A:
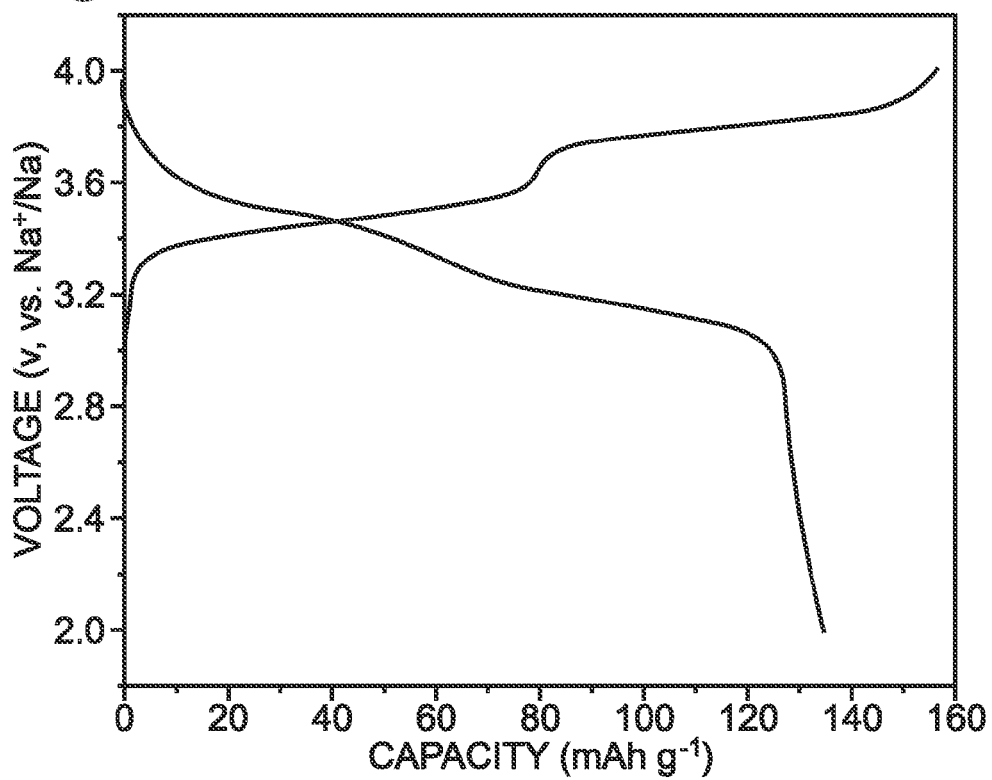
FIGS. 5A and 5B are galvanostatic initial charge and discharge profiles of Sample 1 and Sample 2, respectively, at a rate of 0.1 C (15 milliamps per gram (mA/g)) in the voltage range of 2.0-4.0 V with a Na counter electrode.
Figure 5B:
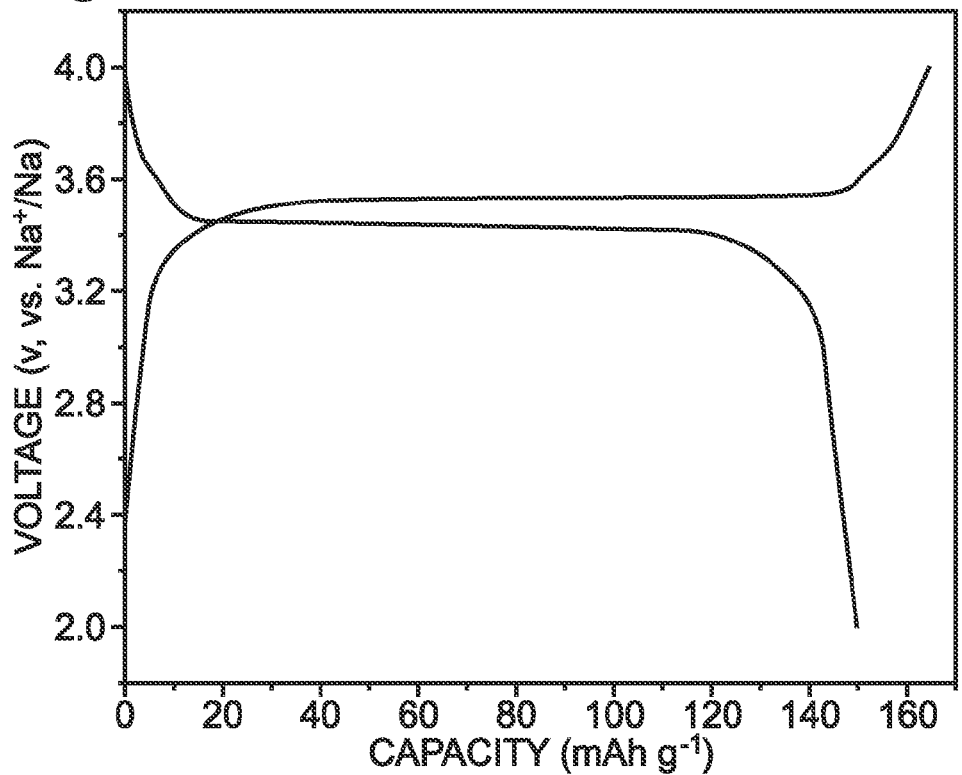
Figure 5C:
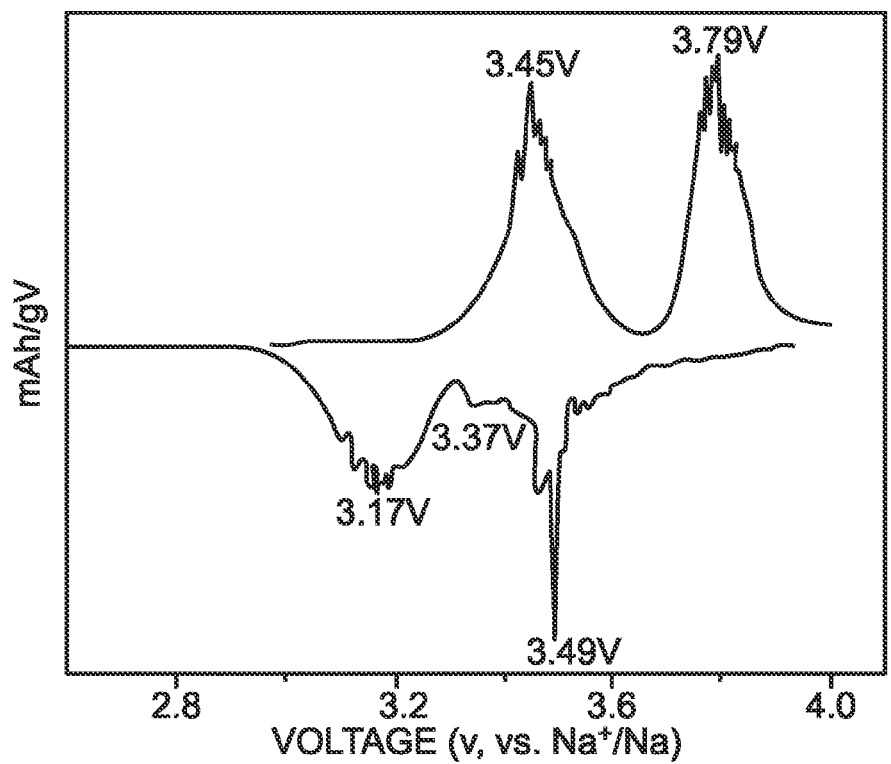
FIGS. 5C and 5D are, respectively, derivative peaks (dQ/dV) plotted as a function of V.
Figure 5D:
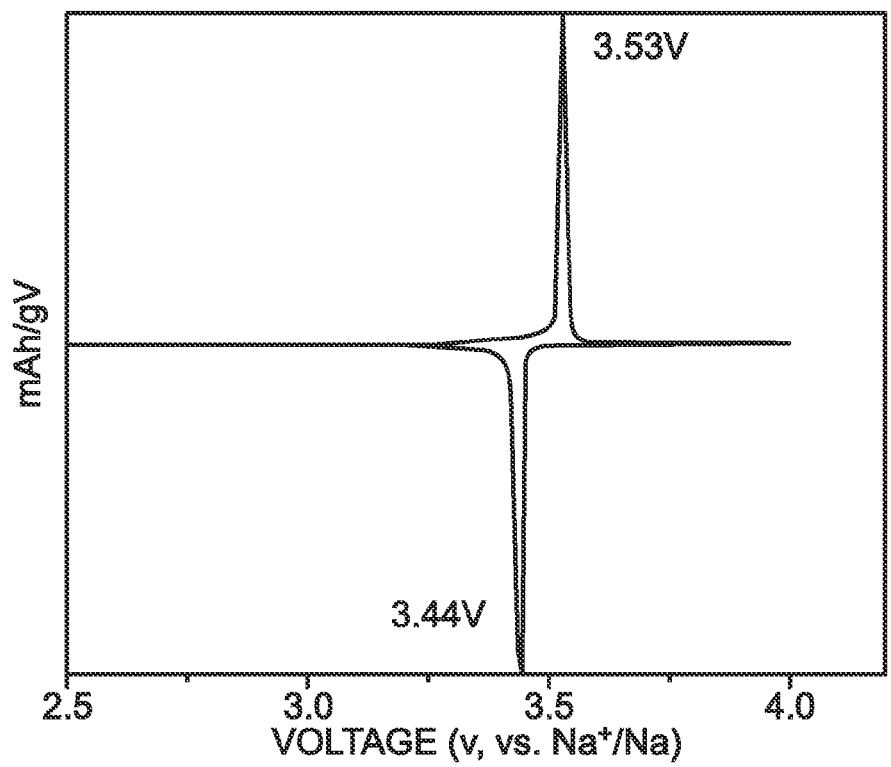

FIGS. 5A and 5B are galvanostatic initial charge and discharge profiles of Sample 1 and Sample 2, respectively, at a rate of 0.1 C (15 milliamps per gram (mA/g)) in the voltage range of 2.0-4.0 V with a Na counter electrode. FIGS. 5C and 5D are, respectively, derivative peaks (dQ/dV) plotted as a function of V. FIG. 5D depicts a single derivative peak (dQ/dV) vs. voltage. As used herein, a single derivative peak (dQ/dV) vs. voltage refers to a single inflection or perturbation in an otherwise unchanged curve of mAh/gV, where a peak is defined as a 5× higher magnitude than the unchanged curve. The zeolitic water affects the electrochemical behavior of PBAs significantly. The figures show the comparison of the first-cycle charge/discharge curves of samples in sodium half-cells in which sodium metal was the counter electrode (anode). Sample 1 exhibits two steps of intercalation, at 3.45 V and 3.79 V on charge, and 3.17 V and 3.49 V on discharge. The two derivative peaks (FIG. 5C) indicate that the PBA undergoes two phase transformation steps during the charge/discharge process. In contrast, Sample 2 displays an apparently single flat plateau at 3.53 V on charge, 3.44 V on discharge. The single derivative peak (FIG. 5D) indicates that the PBA undergoes a single phase transformation step of PBA during the charge/discharge cycling process. In addition, Sample 2 shows a higher cycle efficiency than Sample 1. Cycling efficiency is the ratio of the discharge capacity to charge capacity. Furthermore, the peak position difference between charge and discharge for Sample 2 is only 100 mV, as compared to 300 mV for Sample 1. This indicates that Sample 2 has a higher energy efficiency than Sample 1. Sample 2 has a higher reversible capacity (150 mAh g-1) at 0.1 C rate over 2.0≤V≤4.0 V than Sample 1 (135 mAh/g). The removal of zeolitic water from the PBA material improved its energy density from ~440 watt hours per kilogram (Wh/kg) to ~540 Wh/kg.

Figure 6A:
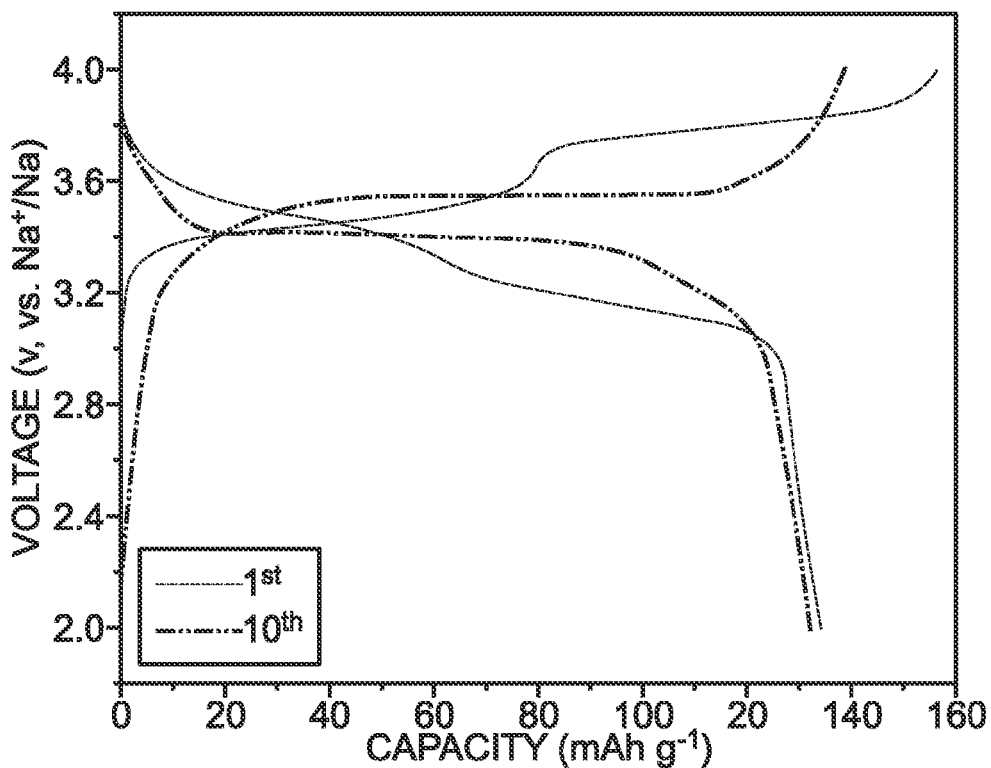
FIG. 6A is a graph depicting charge and discharge curves of Sample 1 on the first and tenth cycles.
Figure 6B:
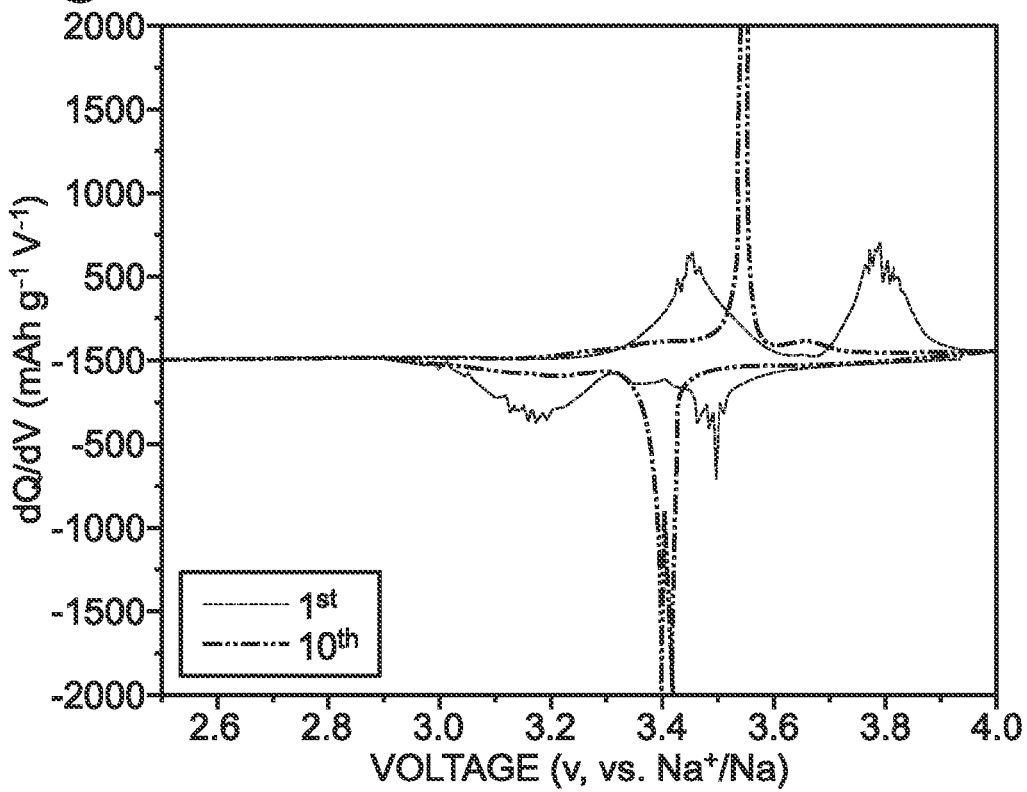
FIG. 6B depicts the derivative curves (dQ/dV) vs. voltage of the first and tenth cycles.

FIG. 6A is a graph depicting charge and discharge curves of Sample 1 on the first and tenth cycles. FIG. 6B depicts the derivative curves (dQ/dV) vs. voltage of the first and tenth cycles. Note that after 10 cycles, the charge/discharge curve and its derivative curve (dQ/dV vs V) for Sample 1 converged to those resembling Sample 2 (see FIG. 5B), which indicates that the zeolitic water is gradually extracted from the PBA lattice as the material is cycled. Because of the high working voltage in the non-aqueous sodium-ion batteries, it is certain that this water decomposed or reacted with sodium and degraded battery performance. In the half cell with a Na metal anode, the degradation caused by water was not detrimental because the excess sodium in the counter electrode (anode) compensated for the sodium consumption. In contrast, the degradation could be observed clearly from full cells without excess sodium sources, see FIGS. 7A and 7B.

Figure 7A:
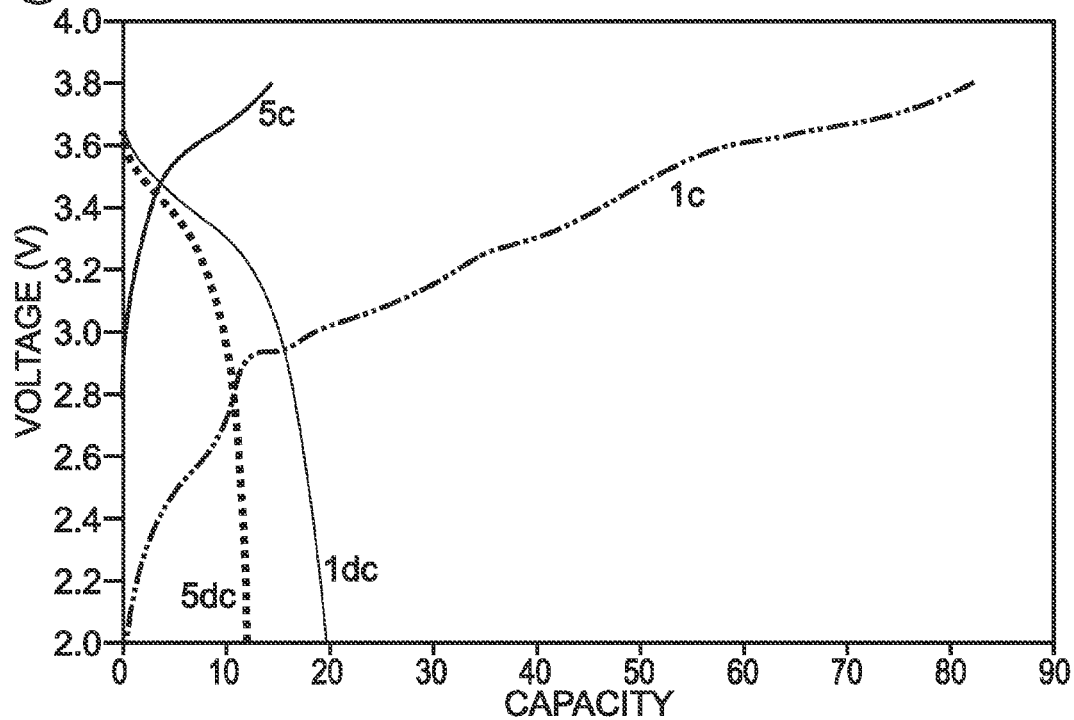
FIGS. 7A and 7B are graphs demonstrating the performance of full cells with a hard carbon anode comparing, respectively, a Sample 1 cathode to a Sample 2 cathode.
Figure 7B:
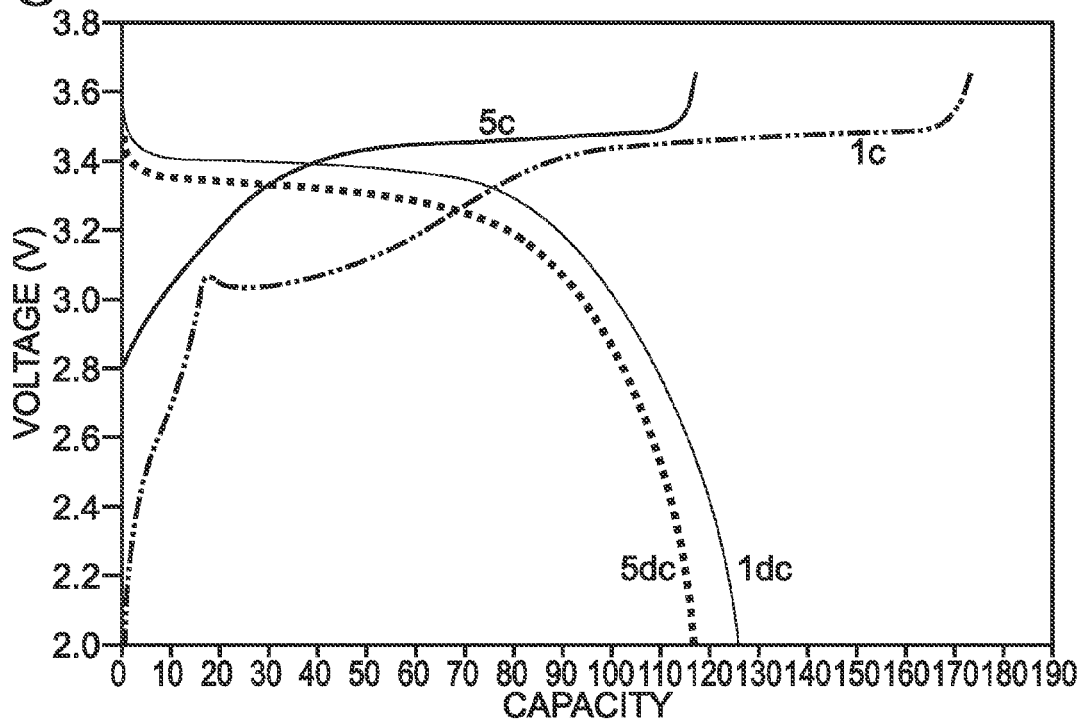

FIGS. 7A and 7B are graphs demonstrating the performance of full cells with a hard carbon anode comparing, respectively, a Sample 1 cathode to a Sample 2 cathode. With the cathode of Sample 1, the cell performance was very poor because its zeolitic water was released from the lattice during cycling. The released zeolitic water reacted with Na-ions and quickly degraded the battery performance. In contrast, the PBA material of FIG. 7B (Sample 2) exhibited stable performance upon cycling, although bound water still existed in the crystal lattice.

Example 2

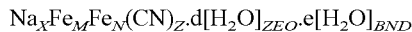

Figure 8:
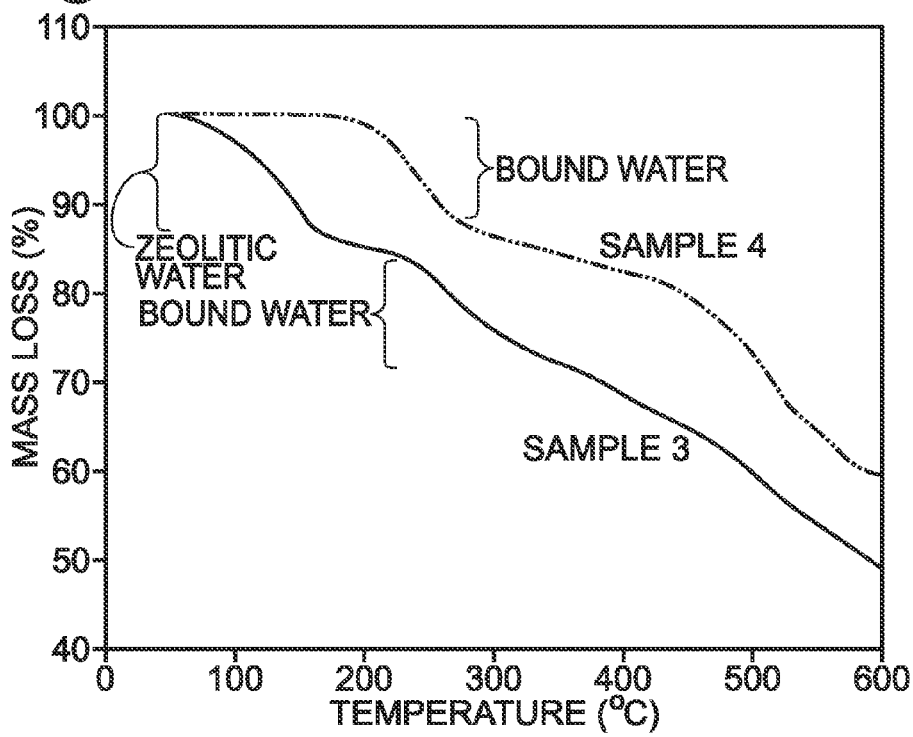
FIG. 8 shows TGA curves depicting the weight loss of PBA with (Sample 3) and without (Sample 4) zeolitic water.

FIG. 8 shows TGA curves depicting the weight loss of PBA with (Sample 3) and without (Sample 4) zeolitic water. Zeolitic water also affects the performance of $Na_XFe_MFe_N(CN)_Z \cdot d1[H_2O]_{ZEO} \cdot e1[H_2O]_{BND}$. Sample 3 was dried at 100 degrees C. after synthesis. Sample 3 was subjected to TGA analysis, showing that zeolitic water was released from the lattice at temperatures between 70 and 150 degrees C., and the bound water was released from the lattice at temperatures higher than 200 degrees C. Therefore, Sample 3 can be represented as $Na_XFe_MFe_N(CN)_Z \cdot d1[H_2O]_{ZEO} \cdot e1[H_2O]_{BND}$, where d1>0. In contrast, Sample 4 had a dehydration process performed at 150 degrees C., in addition to the drying process at 100 degrees C. after synthesis. The TGA data clearly indicates Sample 4 does not contain zeolitic water. Therefore, it can be represented as

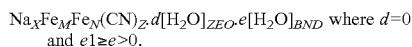

Figure 9A:
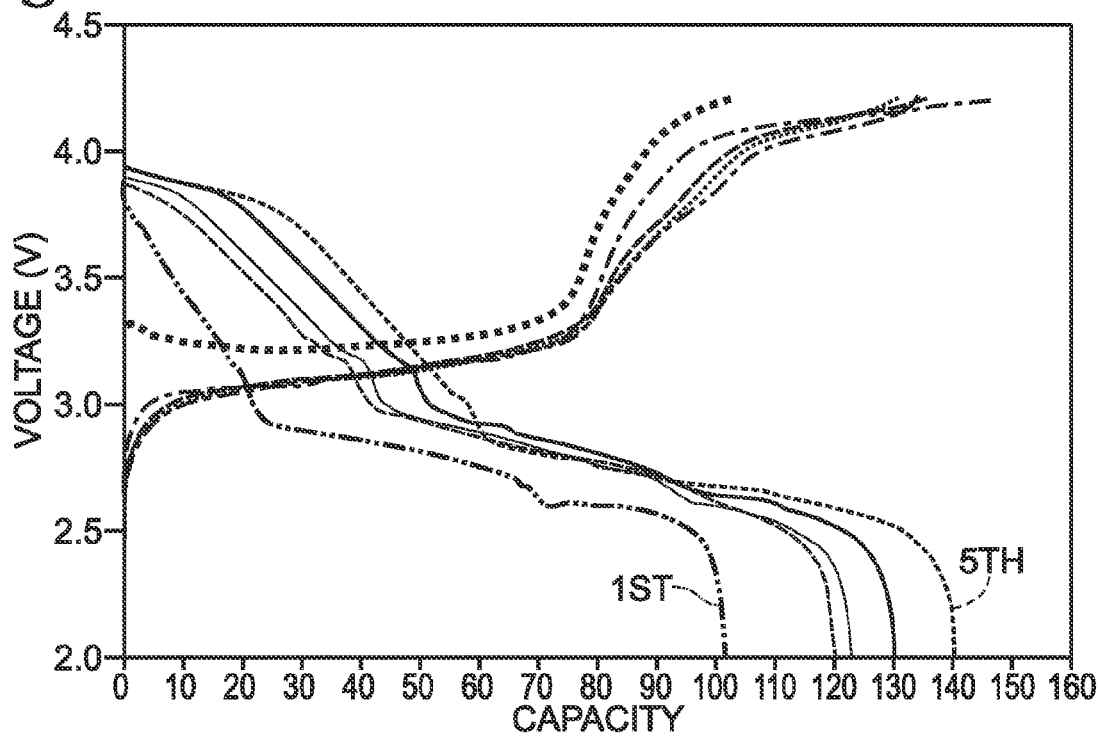
FIGS. 9A and 9B are graphs depicting the galvanostatic charge and discharge profiles, respectively, of Sample 3 and Sample 4 at a current of 1 C (150 mA/g).
Figure 9B:
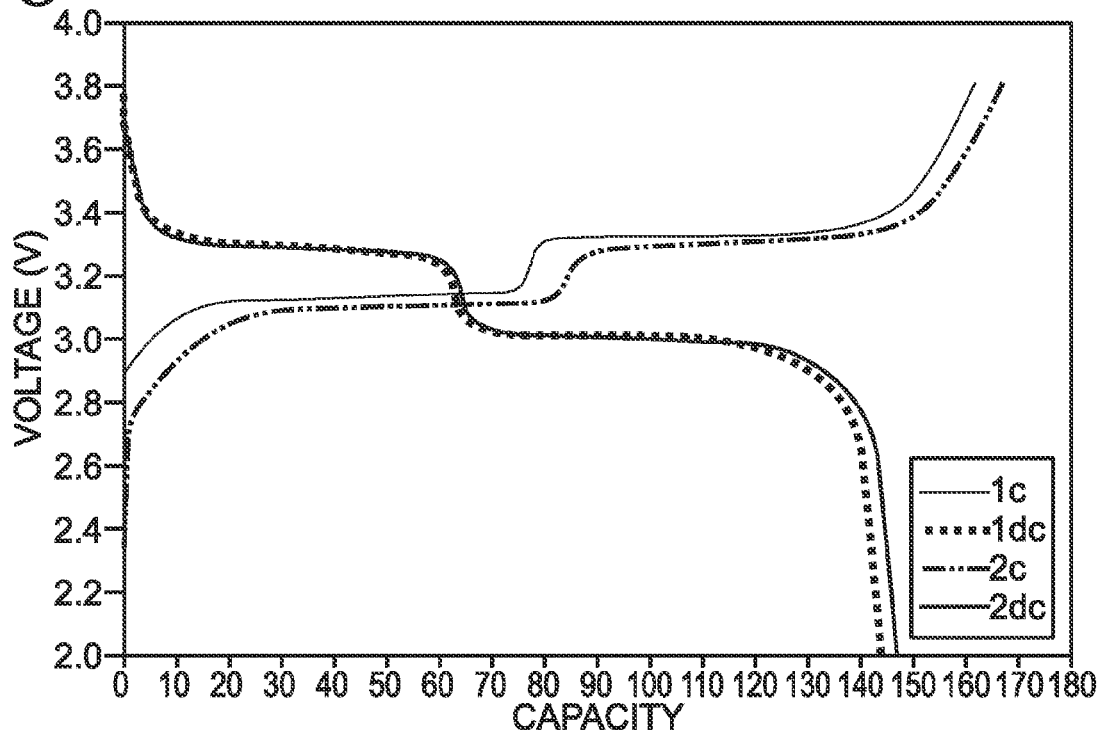

FIGS. 9A and 9B are graphs depicting the galvanostatic charge and discharge profiles, respectively, of Sample 3 and Sample 4 at a current of 1 C (150 mA/g). Sample 3 showed unstable charge/discharge curves from the first cycle to the fifth cycle. The discharge capacity increased with the cycle number. This is due to the fact that the zeolitic water was extracted from the PBA lattice after cycling, so that after cycling, it behaved like Sample 4. Again, the release of zeolitic water degraded the battery performance, although the effect is not so obvious in a half cell (using a Na metal anode) format. In contrast, Sample 4 does not have zeolitic water, so it showed a stable charge/discharge curve (FIG. 9B).

Figure 10A:
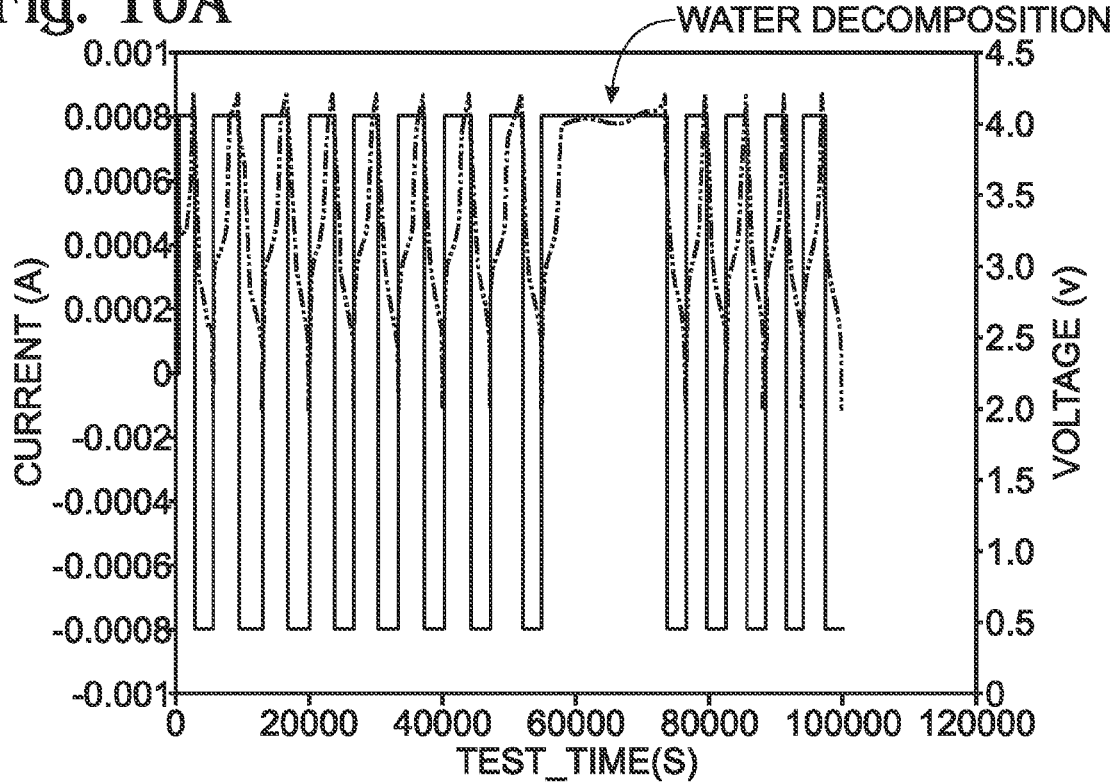
FIGS. 10A and 10B are graphs depicting the unstable and bizarre behavior associated with Sample 3 of the $Na_XFe_M$-$Fe_N(CN)_Z \cdot d1[H_2O]_{ZEO} \cdot e1[H_2O]_{BND}$ material.
Figure 10B:
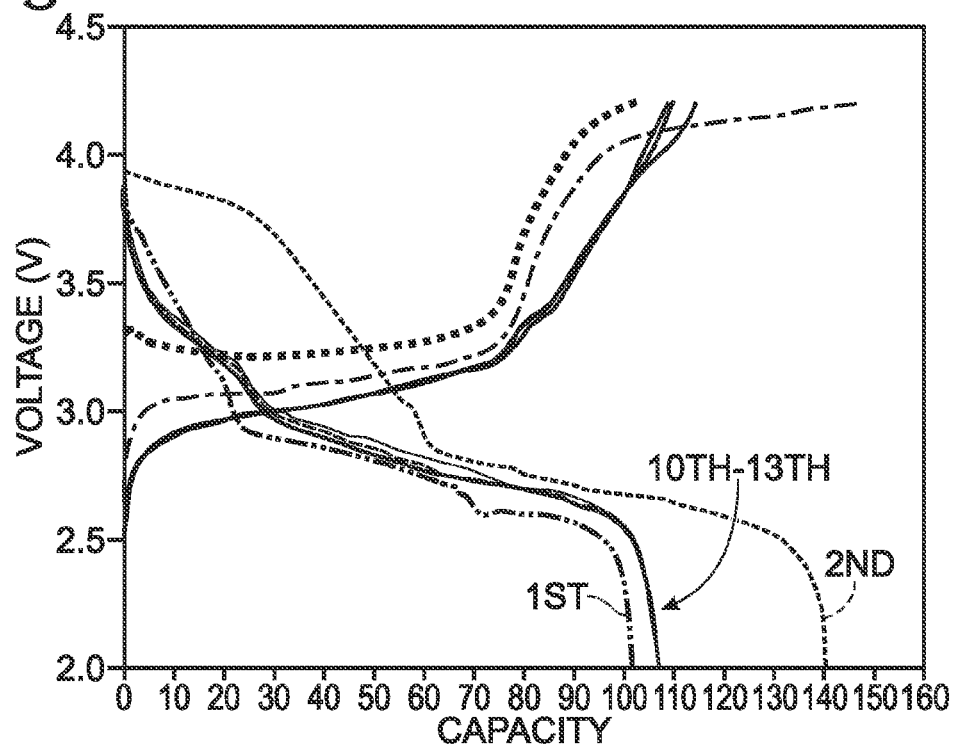
Figure 12:
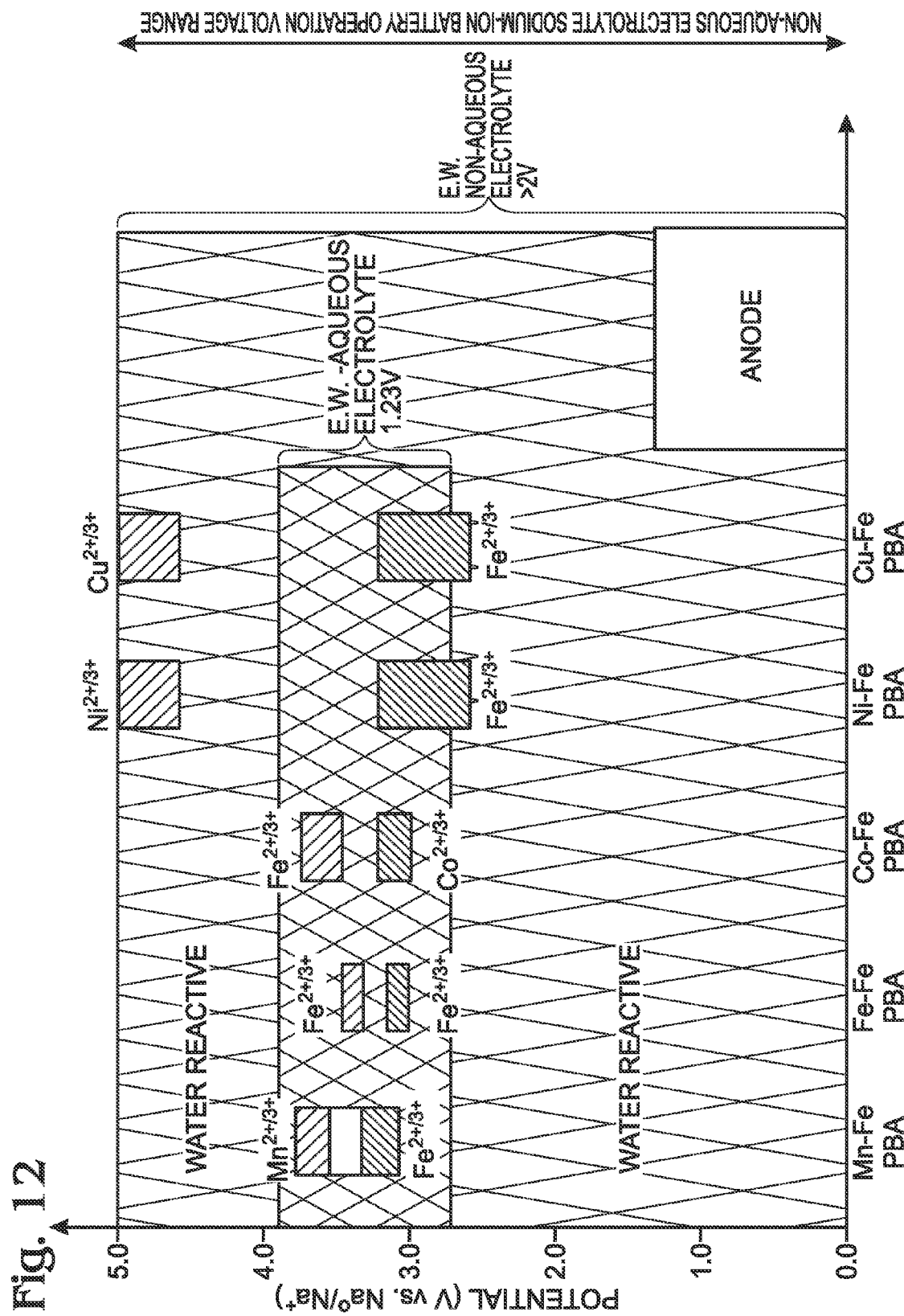
FIG. 12 is a schematic diagram depicting the redox potential of various transition metals vs. Na°.

FIGS. 10A and 10B are graphs depicting the unstable and bizarre behavior associated with Sample 3 of the $Na_XFe_MFe_N(CN)_Z \cdot d1[H_2O]_{ZEO} \cdot e1[H_2O]_{BND}$ material. FIG. 10A depicts one section (marked "water decomposition") with a long charge plateau that is likely associated with zeolitic water being released from the PBA framework. The released zeolitic water decomposed immediately and resulted in an abnormally long charge time. Eventually (FIG. 10B), the zeolitic water was removed completely, and the PBA reached a stable cycling performance with two plateaus (the 10$^{th}$ through 13$^{th}$ cycles), similar to Sample 4. Like in Example 1 ($Na_XMn_MFe_N(CN)_Z \cdot d1[H_2O]_{ZEO} \cdot e1[H_2O]_{BND}$), the high zeolitic water content in $Na_XFe_MFe_N(CN)_Z \cdot d1[H_2O]_{ZEO} \cdot e1[H_2O]_{BND}$ makes it impossible to achieve good, stable performance in full cells with non-sodium anode.

Figure 11:
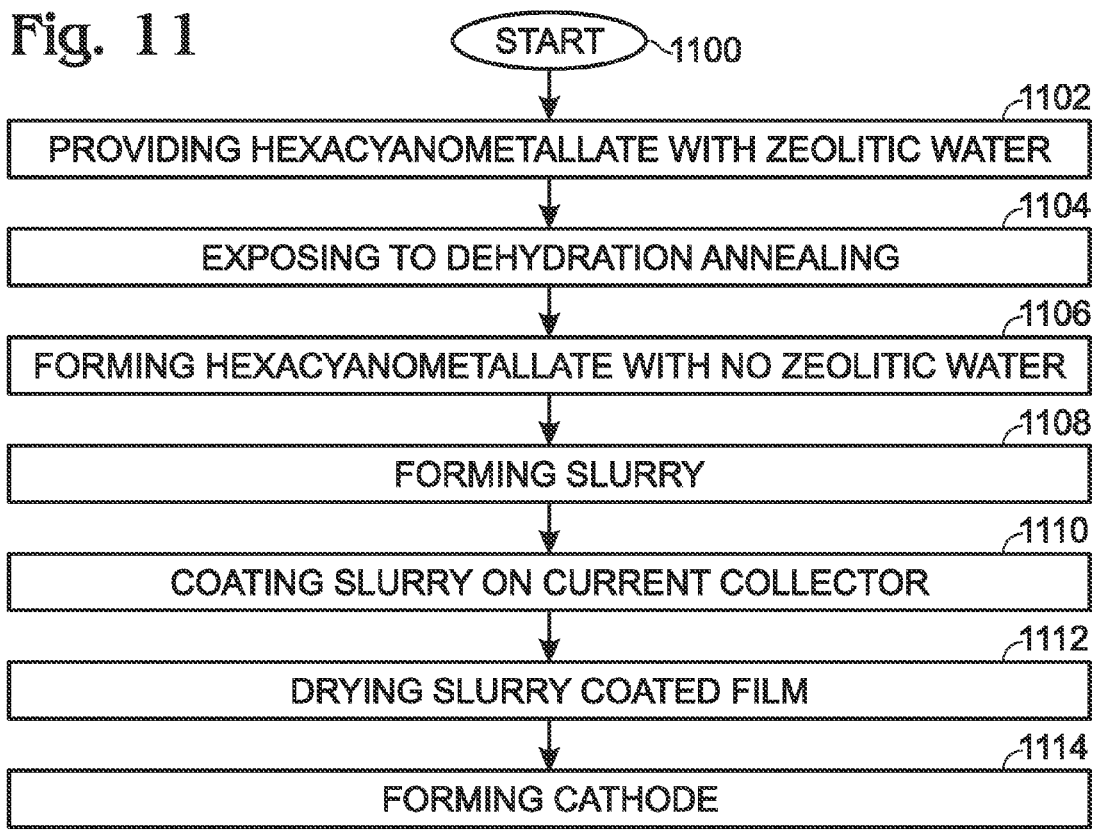
FIG. 11 is a flowchart illustrating a method for fabricating hexacyanometallate cathode with no zeolitic water content.

FIG. 11 is a flowchart illustrating a method for fabricating hexacyanometallate cathode with no zeolitic water content. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1100.

Step 1102 provides hexacyanometallate particles as the primary component having a chemical formula $A_XM1_MM2_N(CN)_Z \cdot d1[H_2O]_{ZEO} \cdot e1[H_2O]_{BND}$, where A is a metal from Groups 1A, 2A, or 3A of the Periodic Table, such as Na$^+$, K$^+$, Mg$^{2+}$, Al$^{+3}$, Zn$^{+3}$, or Ca$^{2+}$;

where M1 is a metal with 2+ or 3+ valance positions, such as Ti, V, Cr, Mn, Fe, Co, Ni, Cu, Zn, Ca, or Mg;

where M2 is a metal with 2+ or 3+ valance positions, such as Ti, V, Cr, Mn, Fe, Co, Ni, Cu, Zn, Ca, or Mg, which may be the same as or a different metal than M1;

where $[H_2O]_{ZEO}$ represents zeolitic water molecules;

where $[H_2O]_{BND}$ represents bound water molecules;

where X is in the range of 0.5 to 2;

where M is in the range of 0.5 to 1.5;

where N is in the range of 0.5 to 1.5;

where z is in the range of 5 to 6;

where d1 is in the range of 1 to 14; and, where e1 is greater than 0.

Step 1104 exposes the hexacyanometallate particles to dehydration annealing at a temperature of greater than 120 degrees C. and less than 200 degrees C. In one aspect, Step 1104 exposes the hexacyanometallate particles to dehydration annealing at a temperature of greater than 140 degrees C. and less than 170 degrees C. In response to the dehydration annealing, Step 1106 forms $A_XM1_MM2_N(CN)_Z \cdot d[H_2O]_{ZEO} \cdot e[H_2O]_{BND}$, where d=0 and e1≥e. Typically, e>0, and in some aspects e has a value of about 6.7.

In one aspect, Step 1108 mixes the hexacyanometallate particles with a conducting carbon and binder in a solvent, to form a slurry. Step 1110 coats the slurry on a current collector. Step 1112 dries the slurry coating to remove the solvent, and Step 1114 forms a cathode. In another aspect, exposing the hexacyanometallate particles to the dehydration annealing in Step 1104 includes performing Step 1104 as follows: 1) prior to forming the slurry in Step 1108, 2) subsequent to removing the solvent in Step 1112, or 3) both prior to forming the slurry and subsequent to removing the solvent.

A hexacyanometallate material has been provided with no zeolitic water content. Examples of particular materials and process details have been presented to illustrate the invention. However, the invention is not limited to merely these examples. Although battery applications were presented in many of the examples, it should be understood that the invention is applicable capacitor and supercapacitor applications where faradaic reactions occur at the cathode and non-faradaic reactions occur at the anode. Other variations and embodiments of the invention will occur to those skilled in the art.

We claim:

1. A battery with a hexacyanometallate cathode, the battery comprising:

a cathode with primarily comprising hexacyanometallate particles overlying a current collector, the hexacyanometallate particles having a chemical formula $A_XM1_MM2_N(CN)_Z \cdot d[H_2O]_{ZEO} \cdot e[H_2O]_{BND}$, where A is a metal from Groups 1A, 2A, or 3A of the Periodic Table;

where M1 is a metal selected from the group consisting of 2+ and 3+ valance positions;

where M2 is a metal selected from the group consisting of 2+ and 3+ valance positions;

where $[H_2O]_{ZEO}$ represents zeolitic water molecules;

where $[H_2O]_{BND}$ represents bound water molecules;

where X is in a range of 0.5 to 2;

where M is in a range of 0.5 to 1.5;

where N is in a range of 0.5 to 1.5;

where Z is in a range of 5 to 6;

where d is 0;

where e is in a range of greater than 0 and less than 8;

a non-aqueous electrolyte; and, an anode.

2. The battery of claim 1 wherein A is selected from the group consisting of $Na^+$, $K^+$, $Mg^{2+}$, $Al^{+3}$, $Zn^{+3}$, and $Ca^{2+}$.

3. The battery of claim 1 wherein the M1 metal is selected from the group consisting of Ti, V, Cr, Mn, Fe, Co, Ni, Cu, Zn, Ca, and Mg; and,
wherein the M2 metal is selected from the group consisting of Ti, V, Cr, Mn, Fe, Co, Ni, Cu, Zn, Ca, and Mg.

4. The battery of claim 1 wherein the M1 metal is selected from the group consisting of the same metal as the M2 metal and a different metal than the M2 metal.

5. The battery of claim 1 wherein the anode material is primarily an electrochemically active material selected from the group consisting of hard carbon, soft carbon, oxides, sulfides, nitrides, silicon, metals, and combinations thereof.

6. The battery of claim 1 wherein the non-aqueous electrolyte is selected from the group consisting of an organic solvent, gel, polymer, and solid electrolytes.

7. A hexacyanometallate cathode comprising:
a current collector;
hexacyanometallate particles as a primary component overlying the current collector, the hexacyanometallate particles having a chemical formula $A_X M1_M M2_N (CN)_Z \cdot d[H_2O]_{ZEO} \cdot e[H_2O]_{BND}$,
where A is a metal from Groups 1A, 2A, or 3A of the Periodic Table;
where M1 is a metal selected from the group consisting of 2+ and 3+ valance positions;
where M2 is a metal selected from the group consisting of 2+ and 3+ valance positions;
where $[H_2O]_{ZEO}$ represents zeolitic water molecules;
where $[H_2O]_{BND}$ represents bound water molecules;
where X is in a range of 0.5 to 2;
where M is in a range of 0.5 to 1.5;
where N is in a range of 0.5 to 1.5;
where Z is in a range of 5 to 6;
where d is 0; and,
where e is in a range of greater than 0 and less than 8.

8. The cathode of claim 7 wherein A is selected from the group consisting of $Na^+$, $K^+$, $Mg^{2+}$, $Al^{+3}$, $Zn^{+3}$, and $Ca^{2+}$.

9. The cathode of claim 7 wherein the M1 metal is selected from the group consisting of Ti V, Cr, Mn, Fe, Co, Ni, Cu, Zn, Ca, and Mg; and
wherein the M2 metal is selected from the group consisting of Ti, V, Cr, Mn, Fe, Co, Ni, Cu, Zn, Ca, and Mg.

10. The cathode of claim 7 wherein the M1 metal is selected from the group consisting of the same metal as the M2 metal and a different metal than the M2 metal.

11. A method for fabricating a hexacyanometallate cathode with no zeolitic water content, the method comprising:
providing hexacyanometallate particles as a primary component having a chemical formula $A_X M1_M M2_N (CN)_Z \cdot d1[H_2O]_{ZEO} \cdot e1[H_2O]_{BND}$,
where A is a metal from Groups 1A, 2A, or 3A of the Periodic Table;
where M1 is a metal selected from the group consisting of 2+ and 3+ valance positions;
where M2 is a metal selected from the group consisting of 2+ and 3+ valance positions;
where $[H_2O]_{ZEO}$ represents zeolitic water molecules;
where $[H_2O]_{BND}$ represents bound water molecules;
where X is in a range of 0.5 to 2;
where M is in a range of 0.5 to 1.5;
where N is in a range of 0.5 to 1.5;
where Z is in a range of 5 to 6;
where d1 is in a range of 1 to 14;
where e1 is greater than 0;
exposing the hexacyanometallate particles to dehydration annealing at a temperature of greater than 120 degrees C. and less than 200 degrees C.; and,
in response to the dehydration annealing, forming $A_X M1_M M2_N (CN)_Z \cdot d[H_2O]_{ZEO} \cdot e[H_2O]_{BND}$, where d=0 and e1≥e.

12. The method of claim 11 wherein exposing the hexacyanometallate particles to the dehydration annealing includes exposure to a temperature greater than 140 degrees C. and less than 170 degrees C.

13. The method of claim 11 wherein A is selected from the group consisting of $Na^+$, $K^+$, $Mg^{2+}$, $Al^{+3}$, $Zn^{+3}$, and $Ca^{2+}$.

14. The method of claim 11 wherein the M1 metal is selected from the group consisting of Ti, V, Cr, Mn, Fe, Co, Ni, Cu, Zn, Ca, and Mg; and,
wherein the M2 metal is selected from the group consisting of Ti, V, Cr, Mn, Fe, Co, Ni, Cu, Zn, Ca, and Mg.

15. The method of claim 11 wherein the M1 metal is selected from the group consisting of the same metal as the M2 metal and a different metal than the M2 metal.

16. The method of claim 11 wherein e>0.

17. The method of claim 11 further comprising:
mixing the hexacyanometallate particles with a conducting carbon and binder in a solvent, to form a slurry;
coating the slurry on a current collector;
drying the slurry coating to remove the solvent; and,
forming a cathode.

18. The method of claim 17 wherein exposing the hexacyanometallate particles to the dehydration annealing includes exposing the hexacyanometallate particles to the dehydration annealing at a step in the method selected from the group consisting of 1) prior to forming the slurry, 2) subsequent to removing the solvent, and 3) both prior to forming the slurry and subsequent to removing the solvent.

* * * * *